United States Patent
Barker et al.

(10) Patent No.: US 6,772,501 B2
(45) Date of Patent: Aug. 10, 2004

(54) APPARATUS AND METHOD FOR THE DESIGN AND MANUFACTURE OF THIN-FILM ELECTROCHEMICAL DEVICES

(75) Inventors: William G. Barker, Littleton, CO (US); Brian S. Berland, Morrison, CO (US); Michael Schwartz, Boulder, CO (US); Lin Simpson, Lakewood, CO (US); Joseph Armstrong, Littleton, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 130 days.

(21) Appl. No.: 09/910,551

(22) Filed: Jul. 23, 2001

(65) Prior Publication Data

US 2003/0015431 A1 Jan. 23, 2003

(51) Int. Cl.[7] .......................... H01S 4/00; C25D 17/00; C23C 4/00; B31B 1/60; B23K 31/00
(52) U.S. Cl. ...................... 29/592.1; 204/242; 204/252; 204/267; 427/446; 427/453; 427/454; 427/596; 427/255.23; 427/421; 427/427; 156/60; 228/179.1; 228/262.9
(58) Field of Search .................. 29/592.1; 204/282, 204/252; 429/34–36; 427/446, 453, 454, 596, 255.23, 421, 427; 156/60; 228/179.1, 262.9

(56) References Cited

U.S. PATENT DOCUMENTS

| | | | |
|---|---|---|---|
| 4,666,798 A | 5/1987 | Herceg ........................ | 429/12 |
| 4,761,349 A | 8/1988 | McPheeters et al. .......... | 429/39 |
| 4,997,727 A | 3/1991 | Bossell ......................... | 429/33 |
| 5,185,219 A | 2/1993 | Ishihara et al. ............... | 429/31 |
| 5,256,499 A | 10/1993 | Minh et al. .................... | 429/33 |
| 5,356,730 A * | 10/1994 | Minh et al. .................... | 429/32 |
| 5,403,461 A * | 4/1995 | Tuller et al. ................. | 204/252 |
| 5,460,897 A | 10/1995 | Gibson et al. ................. | 429/39 |
| 5,480,739 A | 1/1996 | Kawasaki et al. ............. | 429/33 |
| 5,589,017 A | 12/1996 | Minh ........................... | 156/87 |
| 5,770,327 A | 6/1998 | Barnett et al. ................. | 429/32 |
| 5,788,788 A | 8/1998 | Minh ......................... | 156/62.2 |
| 5,882,809 A | 3/1999 | McPheeters et al. .......... | 429/30 |
| 5,922,486 A * | 7/1999 | Chiao ........................... | 429/32 |
| 5,935,727 A * | 8/1999 | Chiao ........................... | 429/32 |
| 5,942,348 A | 8/1999 | Jansing et al. ................ | 429/32 |
| 6,013,386 A | 1/2000 | Lewin et al. | |
| 6,106,967 A | 8/2000 | Virkar et al. .................. | 429/34 |
| 6,165,632 A | 12/2000 | Blum et al. ................... | 429/12 |
| 6,228,520 B1 | 5/2001 | Chiao | |

FOREIGN PATENT DOCUMENTS

| | | |
|---|---|---|
| WO | WO 01/73864 | 10/2001 |
| WO | WO 01/73865 | 10/2001 |
| WO | WO 01/73870 | 10/2001 |

* cited by examiner

Primary Examiner—Donald R. Valentine
(74) Attorney, Agent, or Firm—Lathrop & Gage L.C.

(57) ABSTRACT

The present invention relates to the design and manufacture of single cell units for planar, thin-film, ceramic electrochemical devices such as solid oxide fuel cells, electrochemical oxygen generators, gas separation membranes, and membrane modules and stacks and the fabrication of multi-cell stacks and modules of the single cell units. The design is based upon a single cell wherein manufacturing all layers of the device into an integral unit produces a monolithic structure. The design produces a gas-tight single cell that is easily assembled into multi-cell stacks and modules without external seals or sealing mechanisms. The design may use standard ceramic and metallurgical production techniques. The design of the present invention enhances device performance since the single cell units are inherently sealed for gas tightness and have reduced interfacial electrical resistances. All these features of the novel monolithically integrated unit cell design result in lower manufacturing costs for ceramic electrochemical devices.

50 Claims, 5 Drawing Sheets

APPARATUS AND METHOD FOR THE DESIGN AND MANUFACTURE OF THIN-FILM ELECTROCHEMICAL DEVICES

BACKGROUND OF THE INVENTION

1. Field of the Invention

The present invention relates to the design and manufacture of and includes single cell, basic units for planar, thin-film, ceramic electrochemical devices such as solid oxide fuel cells, electrochemical oxygen generators, gas separation membranes, and membrane modules and stacks and the fabrication of multi-cell stacks and modules from the single cell units.

2. Description of the Prior Art

A solid oxide fuel cell (SOFC) is typically classified with respect to geometry and interconnect materials. With respect to the former, a SOFC has typically either a tubular, planar, or monolithic geometry. Interconnect materials for a SOFC are typically metallic or ceramic.

Although more advanced, tubular SOFCs have a large disadvantage when compared to both planar and monolithic, SOFCs. The power density, i.e., the amount of power the device produces relative to its volume, is much lower. This can be a severe problem where relatively small-scale, less than 500 kW, power generation is desired. Both planar and monolithic SOFC designs have much higher power densities and are therefore much more suitable for this situation.

A major difference between monolithic and planar SOFC designs is the interconnect material. In general, the state-of-the-art monolithic designs are applicable only to ceramic interconnects. For example, U.S. Pat. Nos. 5,935,727, 5,922,486, 5,882,809, 5,788,788, 5,589,017, 5,256,499, 4,761,349, and 4,666,798 relate various designs for monolithic SOFCs. In general, all these designs require cosintering of the various layers. This precludes the use of metallic interconnects as metals are in general not compatible with typical ceramic sintering conditions. Therefore, typically only ceramic interconnects can be used. The electrically conducting ceramics required for SOFC interconnects are very expensive since they are based on chromium. This high materials cost therefore limits or effectively eliminates the use of monolithic SOFCs in many applications.

An exception to ceramic interconnects in a monolithic SOFC is illustrated in U.S. Pat. No. 5,356,730. This patent relates to the use of a cermet interconnect. This interconnect is comprised of an electrically conducting ceramic, typically based on oxides of chromium, and a metal. However, because of the sintering conditions required, the metal needs to be a noble metal, for example, palladium or platinum. These metals, as well as the electrically conducting ceramic, are expensive and therefore do not solve the problem of SOFC costs.

Several types of planar designs are known in the prior art. In the most conventional approach, individual membrane/electrolyte assemblies (MEAs) are stacked together with interconnects and held together with pressure and high temperature gaskets or cements as seals. See, for example, U.S. Pat. Nos. 6,106,967 and 5,770,327, and as exemplified in FIG. 1. Here, the long-term stability of these SOFCs is questionable since the physical mechanism for applying pressure to the seals can be distorted due to exposure to elevated temperatures for long periods of time. Additionally, seal materials can react with the SOFC materials degrading performance and ultimately leading to failure of the device.

The prior art also relates to designs in which pressure is not required, for example, U.S. Pat. No. 4,997,727. This patent relates to the use of a MEA with a sealing edge formed from the electrolyte. A separate metallic interconnect is used and shaped so that a seal is made between the interconnect and the electrolyte. This design requires that the MEA be electrolyte-supported. This means that the electrolyte will need to be relatively thick, greater than 100 microns, to provide mechanical strength to the MEA. This thick electrolyte reduces overall device performance by increasing resistive losses through the electrolyte. These losses are directly proportional to the electrolyte thickness.

A second example of the prior art for an alternate design in which the use of pressure is not required is U.S. Pat. No. 6,165,632. This patent relates to sealing of metallic composite printing circuit boards to each other or through an electrolyte of an electrolyte/electrode unit. Sealing is achieved through several layers of glass solder and glass ceramics. This additional sealing layer prevents intimate electrical contact between the interconnect and the electrodes and between two interconnects of different cells. Because a fuel cell stack can contain several tens of individual MEAs and interconnects, this poor electrical contact will greatly reduce overall cell performance by adding significant resistive losses.

The prior art also has examples of SOFC designs that are meant to overcome the problem of poor contact between interconnect and electrodes. These designs are, in general, very complicated. For example, U.S. Pat. No. 5,942,348 relates to the use of electrically conducting plates with an ion conducting active layer disposed between them. The design requires several regions on the plates, including insulating and sealing regions. The design is very complex, both in terms of geometry and the requirement for several different types of materials beyond the active SOFC materials. This complexity in turn increases the difficulty and costs of manufacturing the SOFC.

An additional example is U.S. Pat. No. 5,460,897. This patent relates to a fuel cell stack comprised of at least three different subassemblies, each subassembly further comprised of various components requiring several seal regions. Again, this very complex design results in a complicated and multi-step manufacturing procedure adding cost to the device.

U.S. Pat. No. 5,480,739 relates to an SOFC design which uses plasma spraying to form an interconnect in order to achieve a tight contact between the interconnect and electrode. Likewise, U.S. Pat. No. 5,185,219 also relates to the direct deposition of an interconnect layer onto an electrode surface. However, in these designs, no provision is made for directly applying a second interconnect to the second electrode surface. This results in poor electrical connections between the individual cells that are within the stack. Additionally, U.S. Pat. No. 5,480,739 does not teach how the feature of direct formation of the interconnect can be applied with respect to sealing and gas manifolds within a planar SOFC design.

SUMMARY OF THE INVENTION

The present invention relates to the design and manufacture of and includes single cell, basic units for planar, thin-film, ceramic electrochemical devices such as solid oxide fuel cells, electrochemical oxygen generators, gas separation membranes, and ceramic membrane modules and stacks and multi-cell stacks and modules of the single cell or planar units. The design of the present invention is exemplified by an embodiment based upon a single cell in which all the desired layers of the device are manufactured into an integral unit producing a monolithic structure. This design produces, for example, a single cell that is gas-tight and can be easily assembled into multi-cell stacks and modules without the need for external seals or sealing mechanisms. This design is also compatible with standard ceramic and metallurgical production techniques. The present invention will enhance overall device performance because, for example, the basic single cell units are inherently sealed for gas tightness and manufactured with reduced interfacial electrical resistances. All of these features of the novel monolithically integrated unit cell design of the present invention will result in lower manufacturing costs for ceramic electrochemical devices.

The present invention, for example, overcomes the problem of expensive ceramic interconnects through a SOFC design which is compatible with the use of less expensive metallic interconnects. The present invention also produces a SOFC that does not require pressure or additional seals for operation therefore contributing to device lifetime. The present invention is able, for example, to utilize an electrolyte layer that is thin, such as, for example, less than 20 microns, which in turn yields devices with low resistive losses in the electrolyte, and consequently high performance. The present invention also may, for example, provide a means of intimate electrical contact between the interconnect and electrodes, and thereby obtain overall higher performance, with the additional benefit of not requiring additional sealing materials. The present invention overcomes the complexity of prior designs and manufacturing processes by, for example, relying on a monolithically integrated, five layer unit cell suitable for use with metallic interconnects that may be easily incorporated into a multi-cell stack or module.

One approach of the present invention is to begin by manufacturing the trilayer core by standard ceramic processing techniques. This core may comprise an anode layer, an electrolyte layer, and a cathode layer. The names of these layers are illustrative only, and not necessarily indicative of electrical or electrochemical function. In applications other than a fuel cell, for instance an oxygen generator, the anode layer and cathode layer may serve identical functions to one another, and may be interchangeable or reversible. Additionally, in an oxygen separation membrane the anode and cathode layers may, for example, comprise catalyst layers.

The first step in one embodiment of the present invention, in manufacturing the trilayer core, is to fabricate the anode layer. The anode layer may comprise any material that has four preferred elements: it promotes the oxidation of the fuel (for example, hydrogen, natural gas, propane, or other hydrocarbon), it is an oxide ion conductor, it is an electron conductor, and it matches the thermal expansion coefficient of the electrolyte layer. These four elements may be met by a single phase material or may comprise a plurality of materials, that together or separately have all the elements.

A general example of a single phase anode material is a mixed ion electron conductor (MIEC). A more specific example of a single phase anode material is a ceramic MIEC. A yet more specific example of a single phase anode is a ceramic MIEC crystallizing in the perovskite or fluorite structure. Other structures that are capable of providing the same functionality are not precluded. A specific example of the perovskite structure is strontium-doped lanthanum cobalt oxide. A specific example of a fluorite structure is a doped ceria. Ceramic MIECs that crystallize in other structures may also be used, provided that they have the above elements. Although ceramic MIECs are not the preferred anode materials, they may be used.

A general example of a multiphase anode material comprises a metal and one or a plurality of ceramic phases (cermet). A specific example of an anode cermet is Ni/yttria stabilized zirconia. In this example, the Ni serves both to oxidize the fuel and provide electrical conductivity while the yttria stabilized zirconia provides ionic conductivity. A second specific example of an anode cermet is a cermet consisting of Cu, cerium oxide and yttria stabilized zirconia. In this example, the copper provides electrical conductivity, the yttria stabilized zirconia provides ionic conductivity and the cerium oxide promotes the fuel oxidation. Other metals and ion conducting ceramics may be used instead of those in the preceding examples. In the present invention, the preferred materials are a Ni/yttria stabilized zirconia cermet and a copper, cerium oxide and yttria stabilized zirconia cermet.

The anode in this embodiment of the present invention may be fabricated by any number of metal or ceramic processing techniques. Specific examples of these techniques include tape-casting, dry pressing, isostatic pressing (hot, warm or cold), injection molding, slip-casting, extrusion, thermal spray, directed vapor deposition, low-pressure chemical vapor deposition, and tape-calendaring. These examples do not preclude other equivalent methods accomplishing a similar function as is known in the art. In the present invention, tape-casting is the preferred method.

Once the anode layer is fabricated in this embodiment of the present invention, the next step in fabricating the trilayer core is to deposit the electrolyte layer on one face, and around the edges of the anode layer. The electrolyte layer may comprise any oxygen ion or proton conducting material that is chemically stable under the fuel cell or other electrochemical device operating conditions. A specific example of an oxygen ion conductor is yttria stabilized zirconia. A second example of an oxygen ion conductor is gadolinium-doped ceria. A specific example of a proton conductor is gadolinium-doped barium cerate. These examples do not exclude the use of other materials that are known in the art to accomplish the same or similar functions or capabilities. In the present invention, the preferred electrolyte material is yttria stabilized zirconia.

The electrolyte layer may be fabricated by any appropriate thin film ceramic processing technique. Specific examples of these techniques include aerosol spray techniques, tape-casting followed by lamination onto the anode layer, co-casting onto the anode, colloidal deposition, various forms of sputtering, various forms of evaporation, various forms of chemical vapor deposition, and directed vapor deposition. These examples do not preclude the use of other techniques or techniques known in the art to accomplish similar functions or similar results. In the present invention, co-casting onto the anode layer, aerosol spray techniques, tape-casting followed by lamination and directed vapor deposition are the preferred techniques.

The third step in this example of the present invention for fabricating the trilayer core is to deposit the cathode layer on the exposed face of the electrolyte layer. A portion of the face, extending radially inward from the edges should be left exposed. The cathode layer may comprise any material that has the following four preferred elements: it promotes the reduction of molecular oxygen to oxide ions, it is an oxide ion conductor, it is an electron conductor, and its coefficient of thermal expansion matches that of the electrolyte layer. These elements may be met by means of a single phase material or may comprise a plurality of materials, that have all the elements together or separately.

A general example of a single phase cathode material is a mixed ion electron conductor (MIEC). A more specific example of a single phase cathode material is a ceramic MIEC. A yet more specific example of a single phase cathode material is a ceramic MIEC crystallizing in the perovskite structure. Other structures accomplishing the same function are also not precluded. A more specific example of a perovskite structure is strontium-doped lanthanum cobalt iron oxide. This material conducts both oxide ions and electrons and additionally promotes oxygen reduction. Ceramic MIECs that crystallize in other structures may also be used if they have the above elements.

A general example of a multiphase cathode material for use in an embodiment of the present invention is a cathode material comprising two ceramic phases. A specific example is strontium-doped lanthanum manganite/yttria stabilized zirconia. In this example, the strontium-doped lanthanum manganite serves as the electronic conductor and promotes oxygen reduction while yttria stabilized zirconia serves as the oxide ion conductor. A second general example of multiphase cathode material comprises a metal and one or more ceramic phases. A specific example of a multiphase cathode material is a cermet comprising silver and yttria stabilized zirconia. In this example, silver provides electrical conductivity and promotes oxygen reduction while the yttria stabilized zirconia provides ionic conductivity. Other metals and ion conducting ceramics may be used in place of the yttria stabilized zirconia.

The cathode layer of this embodiment of the present invention may be fabricated by any thin film ceramic processing technique. Specific examples of these techniques include screen printing, colloidal deposition, various forms of sputtering, various forms of evaporation, and directed vapor deposition. These examples do not preclude other techniques for depositing the cathode layer. In the present invention, the preferred fabrication techniques are screen printing and directed vapor deposition. It is also preferred that the deposition be accomplished through a mask, so that a portion of the electrolyte face extending inward from the edges remains exposed.

To this trilayer core, interconnect layers may be deposited on the exposed anode layer and cathode layer surfaces, or faces. References to interconnect layers should be recognized as references to interconnect, support, or other structural, but electrically conducting layers. These interconnect layers may comprise a metal, alloy, or other electrical conductor. In the present invention, the preferred material is a ferritic steel alloy, such as, for example, E-Brite® alloy, that resists oxidation at operating temperatures and has coefficient of thermal expansion similar to that of the other fuel cell materials.

The interconnect layers may be deposited using thermal spray techniques, directed vapor deposition, or any other technique which will connect the interconnect layers to the trilayer core, thermal spraying being the preferred technique. The deposition of the interconnect layers may be performed to cover the exposed electrolyte and electrode layers, which has the beneficial result of creating a seal. Additionally, removable cores, comprising organic materials that can easily be oxidized to completely gaseous products, or organic materials, metals, or salts that can be completely removed by dissolution in a solvent, may be placed on one or both of the faces of the trilayer core during the deposition of the interconnect layers. The cores may subsequently be removed to provide gas, vapor, or liquid channels and manifolds, defined by the shape of the removable cores. The shape may be chosen to optimize the performance of the cell. Alternatively, channels and manifolds may be fabricated by using a shaped form that would be incorporated into the channels and manifolds after deposition of the interconnect layer. The material of this form may be any material that is compatible with the fuel cell materials and the gas that will flow through it. A specific example of such a material is a semi-cylindrical form of E-Brite®. The shape of the forms may be chosen to optimize performance of the cell. This process of fabrication of a trilayer core together with interconnect layers results in a sealed, monolithically integrated unit cell that can be easily fabricated into a fuel cell stack.

In another embodiment of the present invention, a buffer layer, or a plurality of buffer layers may be added between the interconnect, cathode, electrolyte, or anode layers. These buffer layers may, for example, protect the metallic interconnect from exposure to hot gasses, and resultant corrosion. These buffer layers may also be functionally graded in composition which may have the beneficial result of reducing stress between the electrode layer, the cathode layer, or the anode layer and the interconnect layers. These buffer layers may comprise a ceramic or a metal ceramic composite that is chemically non-reactive with the surrounding layers. Additionally, it is preferable that the buffer layers comprise electrically conductive materials. Buffer layers are not utilized in the preferred embodiment of the present invention.

To fabricate a stack, these individual five (or more, particularly if buffer layers are utilized) layer units may be bonded to one another through the exposed interconnect faces by transient liquid phase bonding, or other techniques for bonding metal to metal, such as brazing, welding, or soldering. Transient liquid phase bonding is the preferred method of the present invention for bonding five layer units to one another.

In another embodiment of the present invention, interconnect layers may be formed separately from the tri-layer core. These layers may be formed using standard metallurgical techniques, such as, for example, injection molding or pressing. Gas channels and manifolds may be prepared in the interconnect layer during this process. The interconnect may then be connected to a tri-layer core using standard ceramic to metal bonding techniques such as, for example, transient liquid phase bonding. The interconnect layer may preferably be bound to the tri-layer core so that the channels are facing the tri-layer core. These five layer units may then be bound to one another as described above.

In another embodiment of the present invention, interconnect layers may be fabricated from ceramic. These interconnect layers may be formed separately from the tri-layer core by means of standard ceramic processing techniques such as, for example, tape-casting, injection molding, or isostatic pressing. Gas channels and manifolds may be formed directly into the ceramic module layer. An interconnect layer may then be joined to the tri-layer core using standard ceramic joining techniques. Resulting five layer units may be joined to other five layer units using standard ceramic joining techniques.

An object of the present invention is to provide a method of manufacturing electrochemical devices such as planar solid oxide fuel cells, oxygen generators, and ceramic membrane modules and stacks. This method comprises the steps of some various combinations of forming an anode; applying an electrolyte layer to one face of the anode and around the anode's edges; applying a cathode layer to a portion of the exposed face of the electrolyte layer, leaving a gap extending from the edge of the electrolyte face inward; applying a metallic interconnect layer to the anode, covering the entire exposed surface of the anode; and applying a metallic interconnect layer to the cathode layer and to the remaining exposed electrolyte layer, covering the exposed surface of the electrolyte layer. In one embodiment of the present invention, one may make the anode out of Ni/yttria stabilized zirconia. One may also, for example, make the electrolyte of yttria stabilized zirconia. The cathode may, for example, be a composite of strontium-doped lanthanum manganite and yttria stabilized zirconia. The anode may, for example, be formed using tape casting. One may form the electrolyte layer and the cathode layer by thin-film deposition techniques. One may also, for example, use an aqueous spray deposition to form the electrolyte layer. Additionally screen printing may be used to form the cathode layer.

One may also add the step of inserting a buffer layer in one embodiment of the present invention. This buffer layer may be added, for example, between an interconnect layer and another layer, or between the electrolyte layer and another layer. In another embodiment of the present invention, while applying an interconnect layer, removable cores may be inserted between the interconnect layer and the layer to which the interconnect layer is being applied.

It is a further object of the present invention to, for example, provide an apparatus for use as a solid oxide fuel cell which has an anode layer, an electrolyte layer, a cathode layer, and two interconnect layers. One may make the anode of, for example, Ni/yttria stabilized zirconia. In another embodiment of the present invention, the electrolyte may be composed of yttria stabilized zirconia. The cathode, in one embodiment of the present invention, may be made of a composite of strontium-doped lanthanum manganite and yttria stabilized zirconia. In another embodiment of the present invention, an interconnect layer may be composed of a metal or alloy. If desired, in an embodiment of the present invention a buffer layer may be added between a pair of the other layers.

It is a further object of the present invention to, for example, provide an apparatus which comprises multiple monolithic fuel cells or gas separation membrane units bonded together. One may bond them together using transient liquid phase bonding.

It is a further object of the present invention, for example, to provide a method of manufacturing stacks of electrochemical devices by bonding multiple fuel cells or gas separation membrane units. In one embodiment of this invention the fuel cells may be bonded together using transient liquid phase bonding.

It is understood that both the foregoing general description and the following detailed description are exemplary and explanatory only and are not restrictive of the invention as claimed. The invention is described in terms of a fuel cell, however, one skilled in the art will recognize other uses for this invention, such as, for example, an oxygen generator. The accompanying drawings illustrating an embodiment of the invention and together with the description serve to explain the principles of the invention.

DETAILED DESCRIPTION OF THE PREFERRED EMBODIMENTS

It is to be understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a layer" is a reference to one or more layers and includes equivalents thereof known to those skilled in the art.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. All references cited herein are incorporated by reference herein in their entirety.

Figure 1:
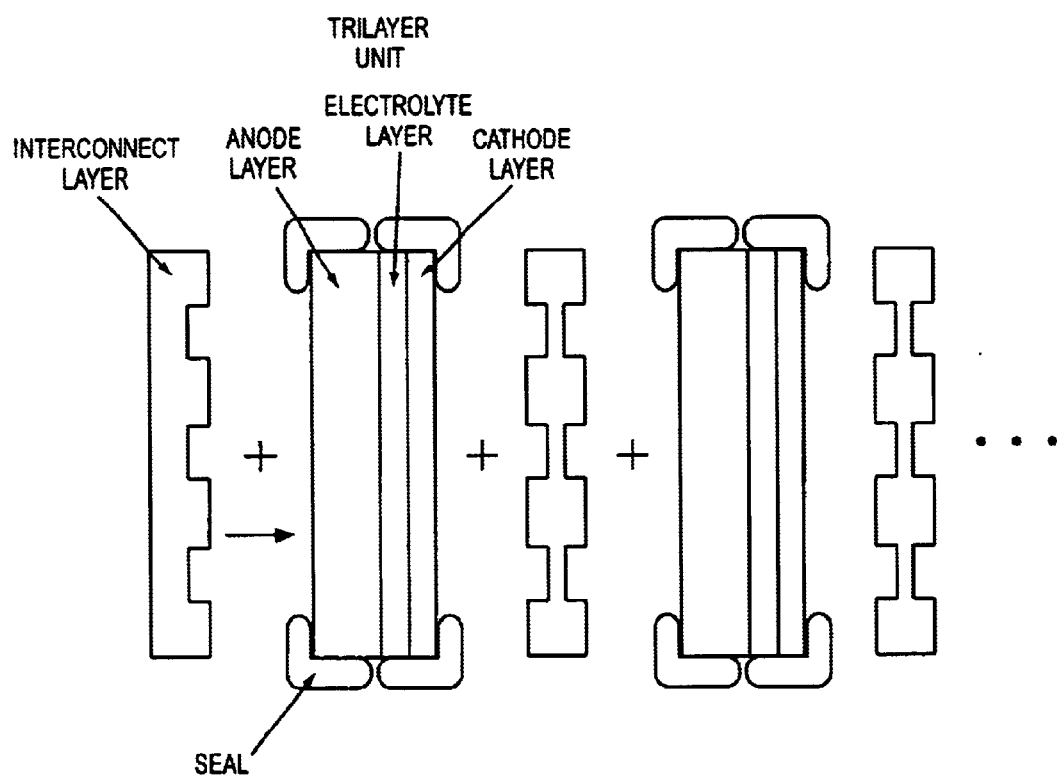
FIG. 1 is a schematic diagram of the state of the art planar cell design and method of stacking.
Figure 2:
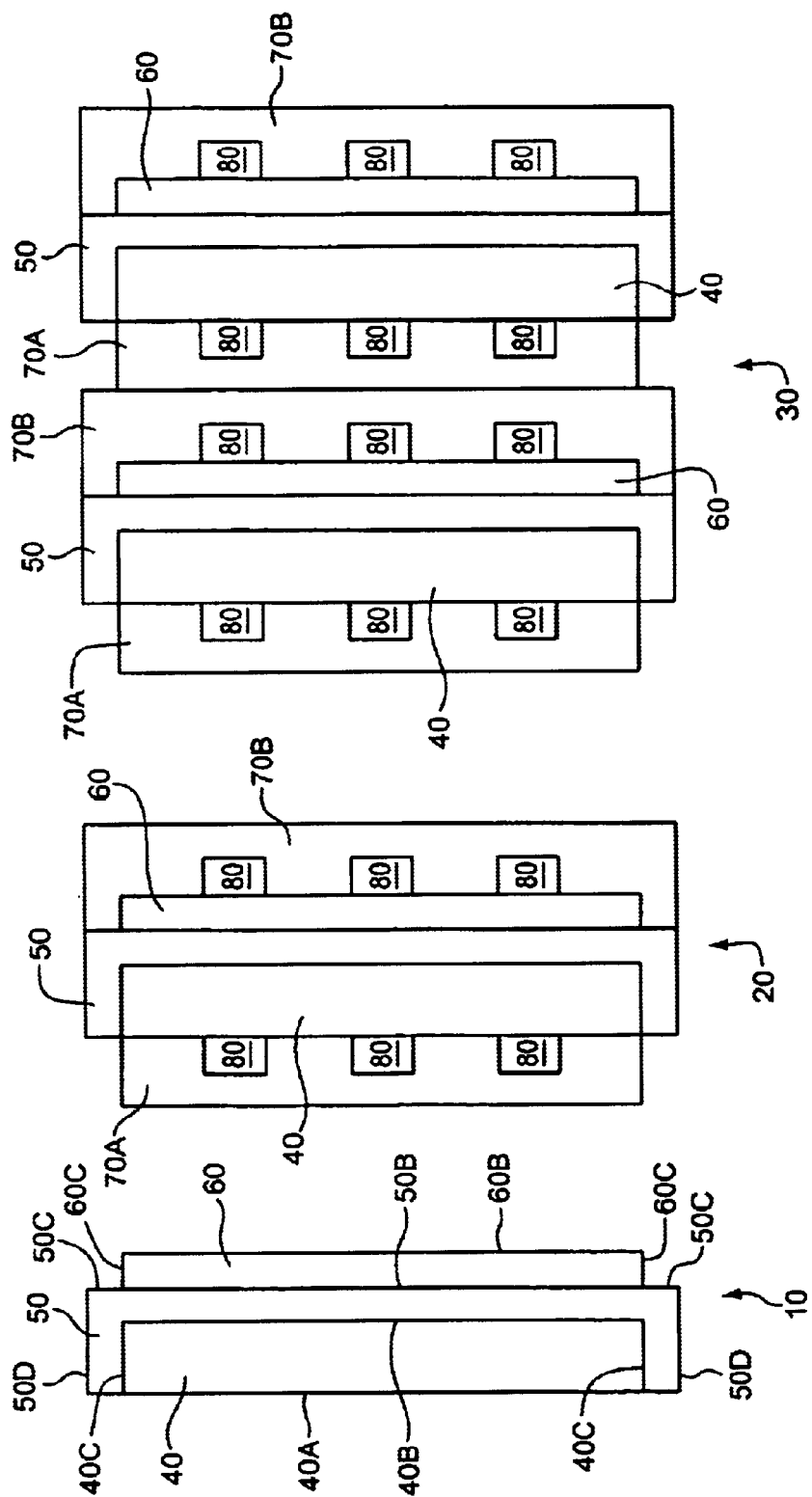
FIG. 2 is a schematic diagram of a preferred embodiment of a multilayer integrated planar cell design and method of stacking.

FIG. 2 depicts a preferred embodiment of the present invention, a five layer unit (20). The five layer unit (20) may, for example, be used for a fuel cell or oxygen generator. The five layer unit (20), comprises two interconnect layers (70A, 70B), and a trilayer core (10). The trilayer core (10) comprises an anode layer (40), an electrolyte layer (50), and a cathode layer (60).

The anode layer (40) may comprise any material that has four preferred elements: it promotes the oxidation of the fuel (for example, hydrogen, natural gas, propane, or other hydrocarbon), it is an oxide ion conductor, it is an electron conductor, and its coefficient of thermal expansion matches that of the electrolyte layer. These four elements may be met by a single phase material or may comprise a plurality of materials, that together or separately satisfy these elements.

A general example of a single phase anode material for use in this embodiment is a mixed ion electron conductor (MIEC). A more specific example of a single phase anode material is a ceramic MIEC. A yet more specific example of a single phase anode is a ceramic MIEC crystallizing in the perovskite or fluorite structure. A specific example of the perovskite structure is strontium-doped lanthanum cobalt oxide. A specific example of a fluorite structure is a doped ceria. Ceramic MIECs that crystallize in other structures may also be used, provided that they have the above elements.

A general example of a multiphase anode material is a metal and one or a plurality of ceramic phases (cermet). A specific example of an anode cermet is Ni/yttria stabilized zirconia. In this example, the Ni serves both to oxidize the fuel and provide electrical conductivity while the yttria stabilized zirconia provides ionic conductivity. A second specific example of an anode cermet is a cermet consisting of Cu, cerium oxide and yttria stabilized zirconia. In this example, the copper provides electrical conductivity, the yttria stabilized zirconia provides ionic conductivity and the cerium oxide promotes the fuel oxidation. Other metals and ion conducting ceramics may be used instead of those in the preceding examples. In the present invention, the preferred materials are a Ni/yttria stabilized zirconia cermet and a copper, cerium oxide and yttria stabilized zirconia cermet.

The anode (40) in this embodiment of the present invention may be fabricated by any number of metal or ceramic processing techniques. Specific examples of these techniques include tape-casting, dry pressing, isostatic pressing (hot, warm or cold), injection molding, slip-casting, extrusion, and tape-calendaring. These examples do not preclude other equivalent methods accomplishing a similar function as is known in the art. In the present invention, tape-casting is the preferred method.

The electrolyte layer (50) may comprise any oxide or proton conducting material that is chemically stable under the fuel cell operating conditions. A specific example of an oxide conductor is yttria stabilized zirconia. A second example of an oxide conductor is gadolinium-doped ceria. A specific example of a proton conductor is gadolinium-doped barium cerate. These examples do not exclude the use of other materials that are known in the art to accomplish the same or similar functions or capabilities. In the present invention, the preferred electrolyte material is yttria stabilized zirconia.

The electrolyte layer (50) may be fabricated by any appropriate thin film ceramic processing technique. Specific examples of these techniques include aerosol spray techniques, tape-casting followed by lamination onto the anode layer, co-casting onto the anode layer, colloidal deposition, various forms of sputtering, various forms of evaporation, various forms of chemical vapor deposition, and directed vapor deposition. These examples do not preclude the use of other techniques or techniques known in the art to accomplish similar functions or similar results. In the present invention, co-casting onto the anode layer, aerosol spray techniques, tape-casting followed by lamination and directed vapor deposition are the preferred techniques.

The cathode layer (60) may comprise any material that has the following four elements: it promotes the reduction of oxygen to oxide ions, it is an oxide ion conductor, it is an electron conductor, and its coefficient of thermal expansion preferably matches that of the electrolyte layer. These elements may be met by means of a single phase material or may comprise a plurality of materials, that have the elements together or separately.

A general example of a single phase cathode material is a mixed ion electron conductor (MIEC). A more specific example of a single phase cathode material is a ceramic MIEC. A yet more specific example of a single phase cathode material is a ceramic MIEC crystallizing in the perovskite structure. A more specific example of a perovskite structure is strontium-doped lanthanum cobalt iron oxide. This material conducts both oxide ions and electrons and additionally promotes oxygen reduction. Ceramic MIECs that crystallize in other structures may also be used if they have the above elements.

A general example of a multiphase cathode material for use in an embodiment of the present invention is a cathode material comprising two ceramic phases. A specific example is strontium-doped lanthanum manganite/yttria stabilized zirconia. In this example, the strontium-doped lanthanum manganite serves as the electronic conductor and promotes oxygen reduction while yttria stabilized zirconia serves as the oxide ion conductor. A second general example of multiphase cathode material comprises a metal and one or more ceramic phases. A specific example of a multiphase cathode material is a cermet comprising silver and yttria stabilized zirconia. In this example, silver provides electrical conductivity and promotes oxygen reduction while the yttria stabilized zirconia provides ionic conductivity. Other metals and ion conducting ceramics may be used in place of the yttria stabilized zirconia.

The cathode layer (60) of this embodiment of the present invention may be fabricated by any thin film ceramic processing technique. Specific examples of these techniques include screen printing, colloidal deposition, various forms of sputtering, various forms of evaporation, thermal spray, and directed vapor deposition. These examples do not preclude other techniques for depositing the cathode layer. In the present invention, the preferred fabrication techniques are screen printing and directed vapor deposition. It is also preferred that the deposition be accomplished through a mask, so that a portion of the electrolyte face extending inward from the edges remains exposed.

In the trilayer core (10) of FIG. 2, the anode (40) is shown with a first anode face (40A), a second anode face (40B), and an anode edge (40C). The electrolyte layer (50) interfaces with the anode (40) at the second anode face (40B) and anode edge (40C). An electrolyte edge surface (50D) is the outer edge surface formed where the electrolyte layer surrounds the anode edge (40C). The cathode layer (60) interfaces with the electrolyte (50) over a first portion of electrolyte surface (50B), leaving a second portion of electrolyte surface (50C) exposed, as shown. The cathode layer (60) is also shown with a cathode face (60B) and a cathode edge (60C).

The interconnect layers (70A, 70B) may comprise a metal, alloy, or other electrical conductor. In the present invention, the preferred material is a ferritic steel alloy that resists oxidation at operating temperatures and has a coefficient of thermal expansion similar to the other fuel cell materials.

The interconnect layers (70A, 70B) may be deposited using thermal spray techniques, or any other technique which will connect the interconnect layers to the trilayer core, thermal spraying being the preferred technique. The deposition of the interconnect layers may be performed to cover the exposed electrolyte layer, which would have the beneficial result of creating a seal.

Additionally, removable cores (not shown), preferably made of organic materials that can be easily oxidized to completely gaseous products or organic materials, metals or salts that can be completely removed by dissolution in a solvent, may be placed on one or both of the faces of the trilayer core during the deposition of the interconnect layers. The cores may subsequently be removed to provide gas, vapor, or liquid channels and manifolds (80), defined by the shape of the removable cores. The shape and size may be chosen to optimize the performance of the cell. Alternatively, channels and manifolds may be fabricated by using a shaped form that would be incorporated into the channels and manifolds after deposition of the interconnect layer. The material of this form may be such that it would be compatible with both the other fuel cell materials and gases flowing through it. A specific example of such a material is a semicylindrical form of E-Brite®. The shape of the forms may be chosen to optimize the performance of the cell. This process of fabrication of a trilayer core together with interconnect layers results in a sealed, monolithically integrated unit cell that can be easily fabricated into a fuel cell stack.

In the five layer unit (20) of FIG. 2, interconnect layer (70A) interfaces with the anode (40) at the first anode face (40A) except where manifolds (80) are formed. Interconnect layer (70B) interfaces with the cathode layer (60) over cathode face (60B) and cathode edge (60C) except where manifolds (80) are formed. Interconnect layer (70B) also interfaces with electrolyte layer (50) at the second portion of electrolyte face (50C), as shown, except where manifolds (80) are formed (i.e., manifolds (80) may cross the interface between interconnect layer (70B) and the second portion of electrolyte face (50C) at locations out of the plane of FIG. 2).

To fabricate a stack (30), these individual five (or more, particularly if buffer layers are utilized) layer units may be bonded to one another through the exposed interconnect faces by transient liquid phase bonding, or other techniques for bonding metal to metal, such as brazing, welding, or soldering. Transient liquid phase bonding is the preferred method of the present invention for bonding five layer units to one another.

Figure 3:
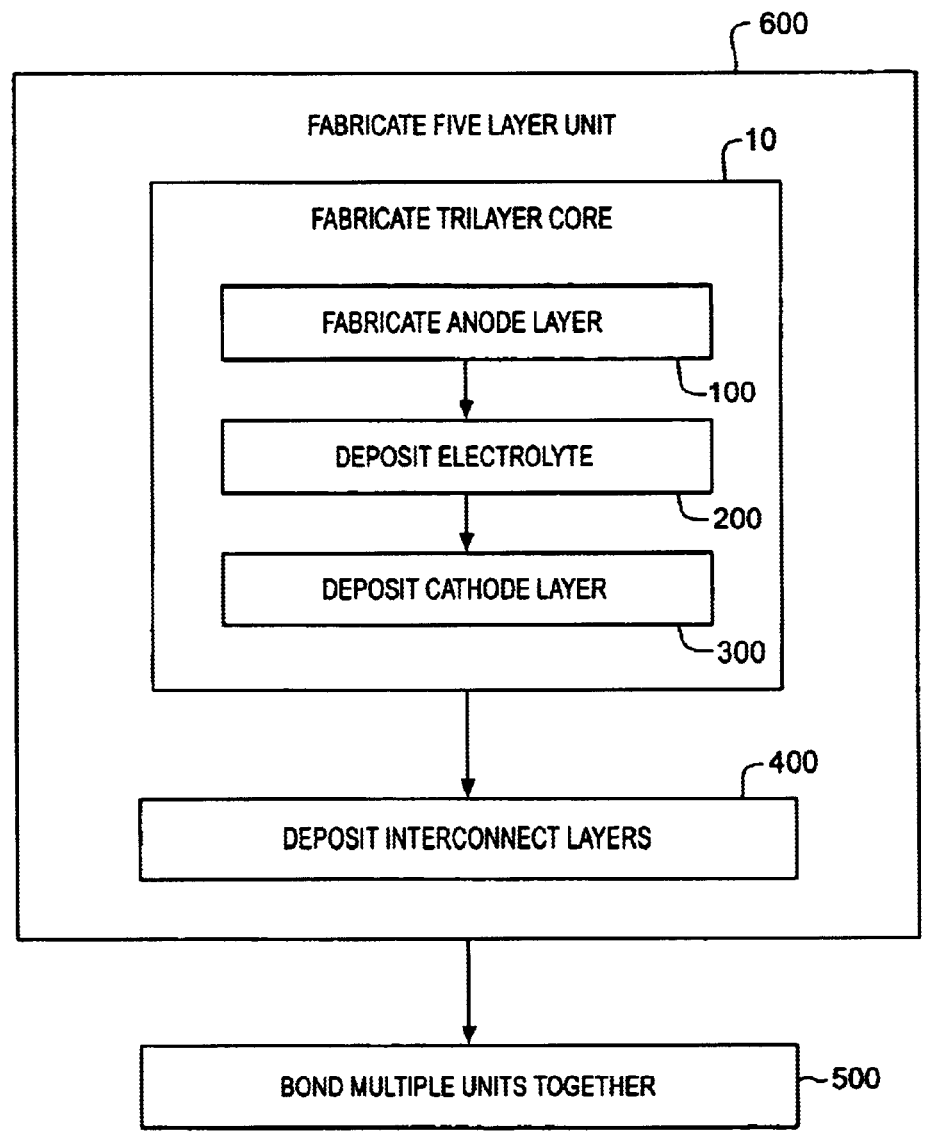
FIG. 3 is a conceptual flow diagram of the method of manufacture of the multilayer integrated planar cell, and stacks of cells of the present invention.
Figure 4:
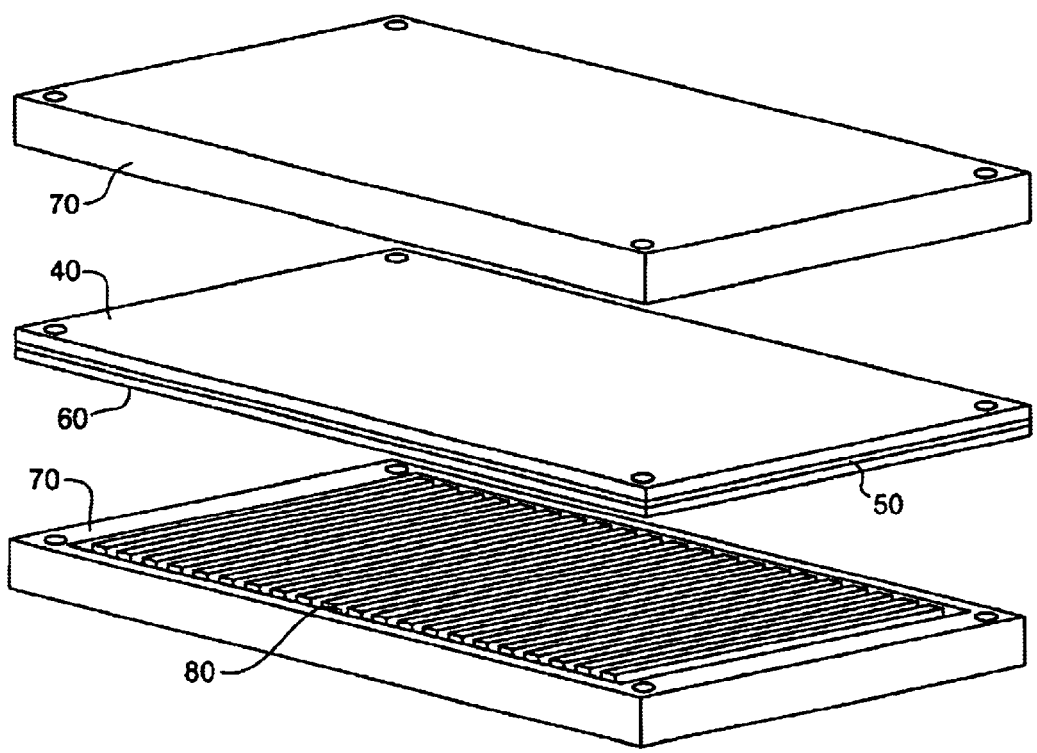
FIG. 4 is a perspective view diagram of a preferred embodiment of a multilayer integrated planar cell design and method of stacking.
Figure 5A:
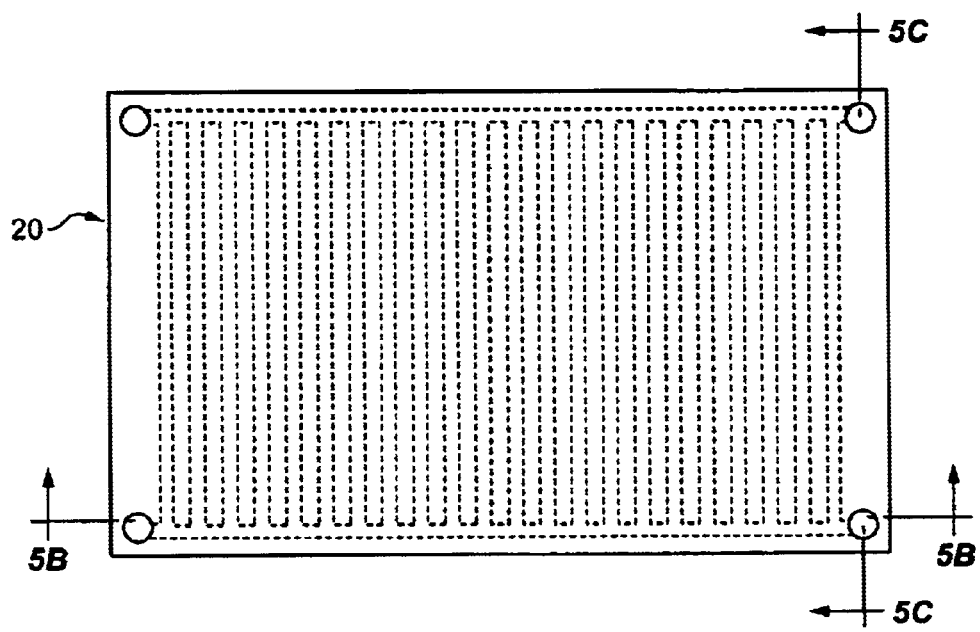
FIG. 5a is a top cut-away view diagram of a preferred embodiment of a multilayer integrated planar cell design and method of stacking.
Figure 5B:
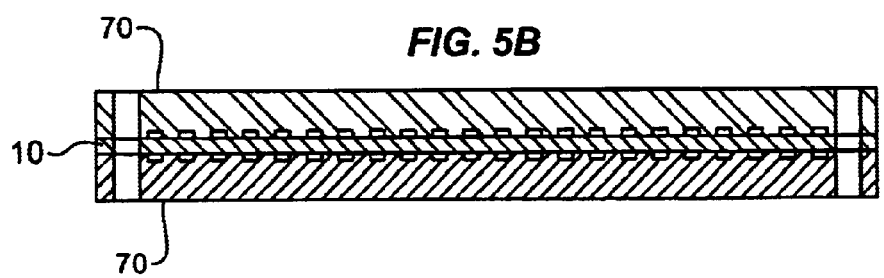
FIG. 5b is a cut-away view diagram through the line A—A of FIG. 5A, which depicts a preferred embodiment of a multilayer integrated planar cell design and method of stacking.
Figure 5C:
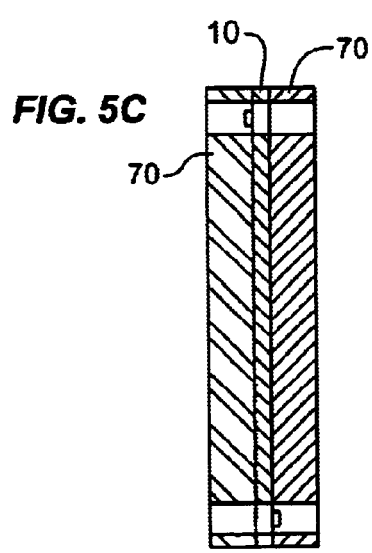
FIG. 5c is a cut-away view diagram through the line B—B of FIG. 5A, which depicts a preferred embodiment of a multilayer integrated planar cell design and method of stacking.

FIG. 3 (FIG. 3) depicts the preferred method of the present invention. The first stage of the method of the present invention is to fabricate the trilayer core (10). This fabrication may comprise several sub-steps. In the substep (100) an anode layer may be formed. Next, an electrolyte layer may be deposited on the anode layer (200). Finally, a cathode layer may be deposited on the electrolyte layer (300). With a trilayer core complete interconnect layers may be deposited (400) on either side of the trilayer core (10) to form a five layer unit (600) utilizing, for example, removable cores or shaped forms. Additionally, one may bond multiple five layer units together to form a fuel cell stack (500).

FIGS. 4, 5a, 5b, and 5c are varying views of a preferred embodiment of the present invention. Consistent with FIG. 2, these figures depict the anode layer (40), electrolyte layer (50), cathode layer (60), and interconnect layers (70) which are interconnect layer (70A) and interconnect layer (70B). Additionally, theses figures depict a specific example of the use of channels and manifolds (80).

It is understood that both the foregoing general description and the following detailed description are exemplary and explanatory only and are not restrictive of the invention as claimed. The accompanying drawings illustrate several embodiments of the invention and together with the description serve to explain the principles of the invention.

Other embodiments of the invention will be apparent to those skilled in the art from consideration of the specification and the practice of the invention disclosed herein. It is intended that the specification and examples be considered as exemplary only, with a true scope and spirit of the invention being indicated by the following claims.

What is claimed is:

1. A method for manufacturing thin-film electrochemical devices comprising the steps of
    forming an anode layer;
    applying an electrolyte layer to one face of said anode layer, and around said anode layer's edges;
    applying a cathode layer to a portion of the exposed face of said electrolyte layer, leaving a gap extending from the edge of said face radially inward;
    applying an interconnect layer to said anode layer, covering the entire exposed surface of said anode layer; and
    applying an interconnect layer to said cathode layer, and to the remaining exposed electrolyte layer, covering the exposed surface of the electrolyte layer.

2. The method of claim 1 wherein said anode layer comprises a Ni/yttria stabilized zirconia cermet.

3. The method of claim 1 wherein said electrolyte layer comprises a material selected from a group consisting of yttria stabilized zirconia, a mixed ion and electron conductor, and a composite of a metal and an ion conductor.

4. The method of claim 1 wherein said cathode layer comprises a composite of strontium-doped lanthanum manganite.

5. The method of claim 1 wherein said cathode layer comprises yttria stabilized zirconia.

6. The method of claim 1 wherein said interconnect layer comprises a material selected from a group consisting of metal, alloy, and ceramic.

7. The method of claim 1 wherein said forming an anode layer comprises tape casting.

8. The method of claim 1 wherein said applying an electrolyte layer comprises a thin-film deposition technique.

9. The method of claim 8 wherein said thin-film deposition technique comprises a technique selected from a group consisting of aqueous spray deposition, tape casting, co-casting onto said anode layer, thermal spray, plasma spray, and directed vapor deposition.

10. The method of claim 1 wherein said applying a cathode layer comprises a thin-film deposition technique.

11. The method of claim 10 wherein said thin-film deposition technique comprises screen printing.

12. The method of claim 1 wherein said applying an interconnect layer comprises a thin-film deposition technique.

13. The method of claim 12 wherein said thin-film deposition technique comprises a technique selected from a group consisting of thermal spray, directed vapor deposition, plasma spray, tape-casting, and co-casting onto a porous catalyst layer.

14. The method of claim 1 wherein said applying an interconnect layer comprises applying over a removable core.

15. The method of claim 1 wherein said applying an interconnect layer comprises applying over a shaped form.

16. The method of claim 1 wherein said applying an interconnect layer comprises a ceramic-to-metal joining technique.

17. The method of claim 16 wherein said ceramic-to-metal joining technique comprises a technique selected from a group consisting of transient liquid phase bonding and brazing.

18. The method of claim 1 further comprising applying a buffer layer between a pair of layers.

19. The method of claim 18 wherein said buffer layer is applied between an interconnect layer and another layer.

20. The method of claim 1 wherein said anode and said cathode layer comprise porous catalyst layers.

21. The method of claim 20 wherein said porous catalyst layers comprise a material selected from a group consisting of a mixed ion and electron conducting ceramic and a composite of metal and an ion conducting ceramic.

22. The method of claim 20 wherein said porous catalyst layers are formed by a thin-film deposition technique.

23. The method of claim 22 wherein said thin-film deposition technique comprises a technique selected from a group consisting of tape-casting, screen printing, thermal spray, and plasma spray.

24. The method of claim 1 wherein the step of applying an interconnect layer to said anode layer, covering the entire exposed surface of said anode layer, comprises the step of applying an interconnect layer to said anode layer, covering the entire exposed surface of said anode layer and interfacing with one or more edges of the electrolyte layer.

25. An apparatus for use as a thin-film electrochemical device comprising
an anode layer;
an electrolyte layer in contact with one face of said anode layer; and around edges of said anode layer;
a cathode layer formed on a portion of an exposed face of said electrolyte layer; with a gap extending radially inward from edges of said electrolyte layer;
a first interconnect layer on said anode layer; and
a second interconnect layer on said cathode layer and remaining exposed electrolyte layer, covering the exposed surface of the electrolyte layer.

26. The apparatus of claim 25 wherein said anode layer comprises a Ni/yttria stabilized zirconia cermet.

27. The apparatus of claim 25 wherein said electrolyte layer comprises yttria stabilized zirconia.

28. The apparatus of claim 25 wherein said cathode layer comprises a composite of strontium-doped lanthanum manganite and yttria stabilized zirconia.

29. The apparatus of claim 25 wherein an interconnect layer is metallic.

30. The apparatus of claim 25 further comprising a buffer layer between a pair of said layers.

31. An apparatus comprising a plurality of thin-film electrochemical devices of the apparatus of claim 25 bonded together.

32. The apparatus of claim 25 wherein said anode and cathode layers comprise porous catalyst layers.

33. The apparatus of claim 32 wherein said porous catalyst layers comprise a mixed ion and electron conducting ceramic.

34. The apparatus of claim 32 wherein said porous catalyst layers comprise a composite of a metal and an ion conducting ceramic.

35. The apparatus of claim 25 wherein said electrolyte layer comprises a mixed ion and electron conductor.

36. The apparatus of claim 25 wherein said electrolyte layer comprises a composite of a metal and an ion conductor.

37. The apparatus of claim 25 wherein said interconnect layers comprise ceramic.

38. An apparatus comprising a plurality of thin-film electrochemical devices, each comprising
an anode layer;
an electrolyte layer on said anode layer;
a cathode layer on said electrolyte layer;
a first interconnect layer on said anode layer; and
a second interconnect layer on said cathode layer;
wherein two or more layers are bonded together by a technique comprising transient liquid phase bonding.

39. The apparatus of claim 38 further comprising a buffer layer between a pair of said layers.

40. The apparatus of claim 38 wherein said anode and said cathode layers comprise porous catalyst layers.

41. The apparatus of claim 40 wherein said porous catalyst layers comprise a mixed ion and electron conducting ceramic.

42. The apparatus of claim 40 wherein said porous catalyst layers comprise a composite of a metal and an ion conducting ceramic.

43. An apparatus comprising a plurality of thin-film electrochemical devices, each comprising
an anode layer;
an electrolyte layer on said anode layer;
a cathode layer on said electrolyte layer;
a first interconnect layer on said anode layer; and
a second interconnect layer on said cathode layer;
wherein two or more layers are bonded together by a technique comprising brazing.

44. An apparatus comprising a plurality of thin-film electrochemical devices, each comprising
an anode layer;
an electrolyte layer on said anode layer;
a cathode layer on said electrode layer;
a first interconnect layer on said anode layer; and
a second interconnect layer on said cathode layer;
wherein two or more layers are bonded together by a technique comprising ceramic-ceramic bonding.

45. A method of manufacturing stacks of thin-film electrochemical devices comprising the step of connecting a plurality of sequentially connected base units that each contain:
an anode layer;
an electrolyte layer in contact with one face of said anode layer, and around edges of said anode layer;
a cathode layer formed on a portion of an exposed face of said electrolyte layer, with a gap extending radially inward from edges of said electrolyte layer;
a first interconnect layer on said anode layer; and
a second interconnect layer on said cathode layer and remaining exposed electrolyte layer, covering the exposed surface of the electrode layer.

46. The method of claim 45 wherein said connecting comprises a technique selected from a group consisting of ceramic-ceramic bonding, transient liquid phase bonding, and brazing.

47. A method for manufacturing thin-film electrochemical devices comprising the steps of
forming an anode layer that has a face and at least one edge surface;
applying an electrolyte layer to the face of the anode layer and around the edge surface to seal the anode layer and present an exposed face of the electrolyte layer;
applying a cathode layer to a first portion of the exposed face of said electrolyte layer, to leave a second portion of the exposed face that extends inwardly along the electrolyte layer towards the cathode layer;
applying an anode interconnect layer to the anode layer to provide an anode gas manifold structure and seal the anode layer where the anode gas manifold structure is absent; and
applying a cathode interconnect layer to the cathode layer to provide a cathode gas manifold structure and seal the cathode layer where the cathode gas manifold structure is absent.

48. The method of claim 47, wherein:
the electrolyte layer presents an exposed face of the electrolyte layer and an electrolyte edge surface; and
the step of applying a cathode interconnect layer to the cathode layer to provide a cathode gas manifold structure and seal the cathode layer where the cathode gas manifold structure is absent, comprises applying a cathode interconnect layer to the cathode layer and to any portion of the exposed face of the electrolyte layer or the electrolyte edge surface, to provide a cathode gas manifold structure and seal the cathode layer where the cathode gas manifold structure is absent.

49. The method of claim 47, wherein any of the steps of applying an electrolyte layer, applying a cathode layer, applying an anode interconnect layer or applying a cathode interconnect layer comprise a thin-film deposition technique.

50. The method of claim 47, wherein either of the steps of applying an anode interconnect layer or applying a cathode interconnect layer comprise a ceramic-to-metal joining technique.

* * * * *